United States Patent [19]

Tal

[11] 3,871,211

[45] Mar. 18, 1975

[54] TENSIOMETER

[76] Inventor: Aharon Tal, 131 Hanassi St., Herzliya, Israel

[22] Filed: Sept. 21, 1973

[21] Appl. No.: 399,509

[30] Foreign Application Priority Data
Apr. 27, 1973 Israel.................................... 42132

[52] U.S. Cl......................... 73/73, 73/403, 73/409, 73/410
[51] Int. Cl. ............................................. G01n 7/10
[58] Field of Search............ 73/73, 371, 388 R, 403; 116/118 R, 118 A; 272/8 R; 273/1 L

[56] References Cited
UNITED STATES PATENTS

| | | | |
|---|---|---|---|
| 2,361,628 | 10/1944 | Howard............................. | 73/388 R |
| 3,045,477 | 7/1962 | Matson ................................ | 73/73 |
| 3,091,115 | 5/1963 | Roberts................................. | 73/73 |
| 3,330,249 | 7/1967 | Rodgers.............................. | 73/403 |

Primary Examiner—Richard C. Queisser
Assistant Examiner—Marcus S. Rasco
Attorney, Agent, or Firm—Benjamin J. Barish

[57] ABSTRACT

A tensiometer is described for measuring soil-moisture tension, including a tube hermetically sealed at the top and closed at the bottom by a water-permeable member and adapted to be completely filled with water which is permeable through the member into and out of the ground in accordance with the soil-moisture tension. The novel tensiometer, of which several embodiments are described, includes an indicating device containing an expansible chamber, the indicating device being sealed and including a liquid and a captive gas-bubble therein, whereby the expansible chamber expands and contracts, with the change in pressure within the tube caused by the permeation of the water through the permeable member, to indicate the soil-moisture tension of the ground into which the tube is inserted.

2 Claims, 4 Drawing Figures

TENSIOMETER

BACKGROUND OF THE INVENTION

The present invention relates to tensiometers, i.e. pressure-measuring devices, and particularly for measuring the matric (suction) tension of soil for water, this tension being a function of the quantity of water in a given soil sample.

Several types of soil-moisture tensiometers are known. Generally, they include a tube hermetically sealed at the top and closed at the bottom by a water-permeable body (e.g. porous ceramic). The tube is filled with water and the water-permeable end is inserted into the ground with the tube supported in a vertical or inclined position. Water within the tube passes through the water-permeable body in both directions, i.e. into or out of the ground, in accordance with the matric tension of the soil, creating a sub-atmospheric pressure within the tensiometer tube.

Such tensiometers have a number of advantages over other soil-moisture measuring devices, among which are low-cost and simplicity of use. Certain types, however, become inaccurate during use and therefore require frequency recalibration.

SUMMARY OF THE INVENTION

An object of the present invention is to provide novel tensiometers having advantages in the above respects.

According to a broad aspect of the present invention, an indicating device containing an expansible chamber is disposed within the tensiometer tube, the indicating device being sealed and including a liquid and a captive gas-bubble. During use, the expansible chamber expands and contracts, with the change in pressure within the tube caused by the permeation of the water through the permeable member, to indicate the soil-moisture tension of the ground into which the tube is inserted.

According to several of the described embodiments, the indicating device is fixed within the tensiometer tube and includes a capillary tube communicating at its lower end with the expansible chamber and sealed at its tip, the expansion and contraction of the chamber being indicated by the level of the liquid within the capillary tube.

According to another feature of the latter embodiments of the invention, the expansible chamber is fixed substantially distant from the sealed tip of the tensiometer tube so as to be always immersed in the water within the tube during use.

According to a further feature of the latter embodiments, the bottom of the capillary tube may be of larger internal diameter than the main portion thereof, to increase the volume of the passageway from the expansible chamber to the capillary tube, thereby preventing the captive air-bubble within the capillary tube from reaching the expansible chamber.

According to still another feature of the latter embodiments, a first portion of the capillary tube may be provided with graduated markings, and a second portion of the capillary tube, above the first portion, may be of larger internal diameter than the first portion, to thereby effect an expansion in the scale of the graduated markings in the first portion.

According to another described embodiment of the invention, the expansible chamber is freely movable in the tensiometer tube, the expansion and contraction of the chamber being thereby indicated by the lelvel the expansible chamber assumes in the water of the tensiometer tube.

BRIEF DESCRIPTION OF THE DRAWINGS

The invention is herein described, by way of example only, with reference to several preferred embodiments thereof illustrated in the accompanying drawings, wherein.

DESCRIPTION OF THE PREFERRED EMBODIMENTS

Figures 1, 2, 3, 4:
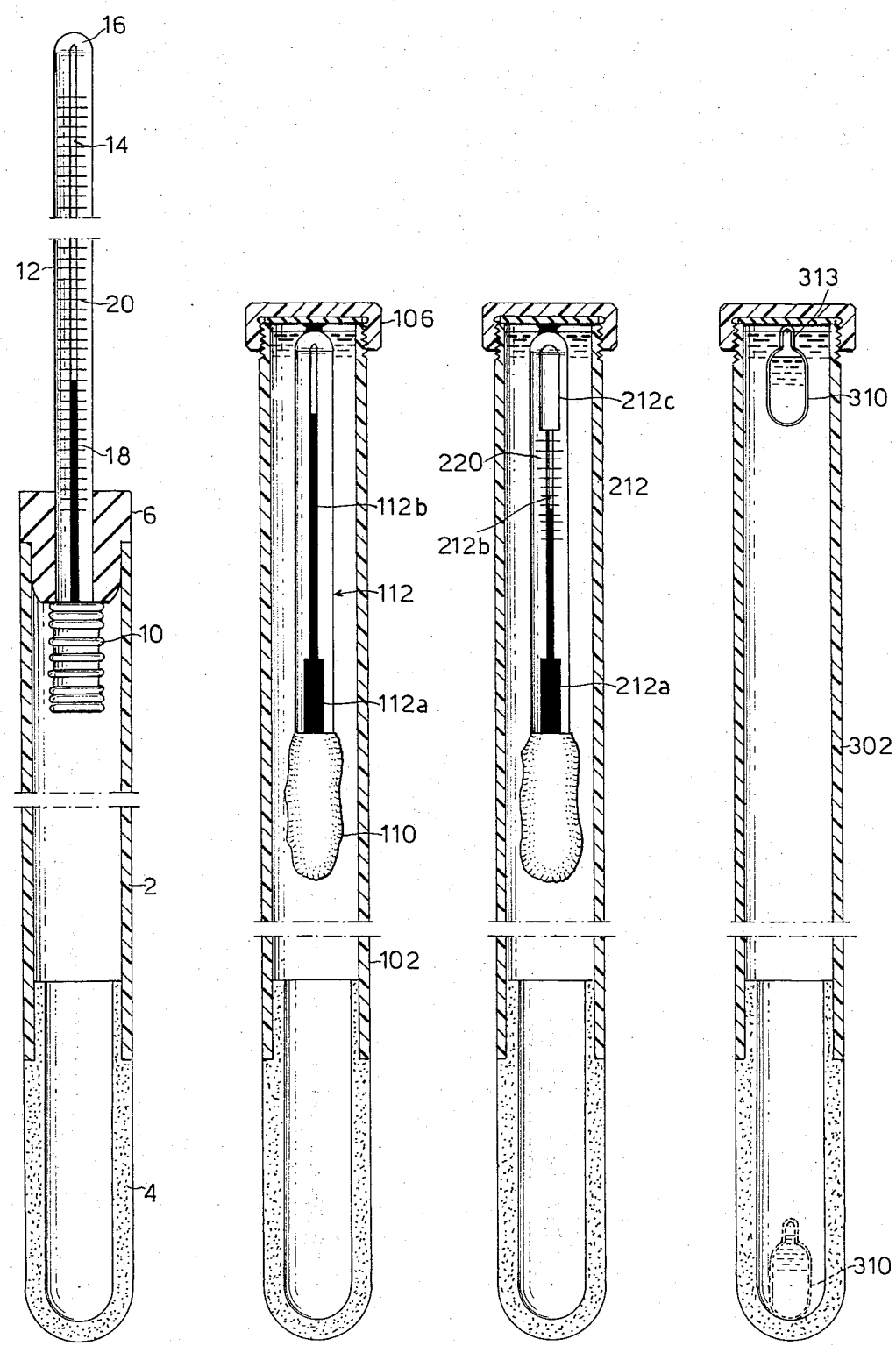
FIG. 1 is a longitudinal sectional view of one form of tensiometer constructed in accordance with the invention.
FIGS. 2 and 3 are corresponding views illustrating several variations and improvements in the tensiometer of FIG. 1.
FIG. 4 is a longitudinal sectional view of another form of tensiometer constructed in accordance with the invention.

The tensiometer illustrated in FIG. 1 comprises a tube 2, preferably of transparent plastic material, having a porous ceramic body or member 4 closing its lower end, and a plug 6 (e.g. of rubber) closing and hermetically sealing its upper end. The tube 2 is filled with water before plug 6 is applied. In use, the tensiometer tube is inserted into the ground in a vertical or inclined position with the water permeable body 4 embedded in the ground. Water within the tube is able to pass through body 4 in either direction. A sub-atmospheric pressure is thus produced within tube 2 (except where the field contains standing water), this pressure being an indication of the soil-moisture tension, and thereby of the soil-moisture content.

The soil-moisture tension is indicated by providing an indicating device including a bellows or expansible chamber 10 within tube 2, the expansible chamber being filled with a liquid. The indicating device further includes a capillary tube 12 which has its lower end inserted into expansible chamber 10 and its distal end 16 sealed at the tip, to contain a captive air-bubble 14.

During use, the volume of the water within tube 2 varies with the soil-moisture content, thereby causing bellows 10 to expand and contract. Expansion of the bellows causes the air-bubble 14 to expand, which will be manifested by a change in the level of the liquid 18 within the capillary tube 12. The liquid preferably includes colouring matter, or a float, to provide a clear indication of its level within the capillary tube. Also, the tube includes graduated markings 20 providing a direct indication of the soil-moisture tension or soil-moisture content.

FIG. 2 illustrates a tensiometer similar to that of FIG. 1 (its parts being correspondingly numbered but raised by "100"), but including a number of improved features.

According to one feature of the present invention, bellows 110 (shown as a plastic bag) is disposed substantially distant from the sealed top 106 of the tensiometer tube 102 so as to always be immersed in the water within the tensiometer tube during use. Preferably the capillary tube 112 is completely disposed within the tensiometer tube 102, by having the top of the former tube fixed to the top 106 of the latter, whereby bellows 110 is at the maximum distance from the top of the tensiometer tube. In this manner, the air at the top of the tensiometer tube cannot penetrate the capillary tube (e.g. of glass or plastic) as easily as it could the bellows 110, or the joint between the bellows and the capillary tube, were the bellows at the top of the tensiometer tube. Thus, the tensiometer retains its sensitivity over a long period of use without the need for recalibration.

According to a further feature of the present invention, the bottom of 112a of the capillary tube 112 is of larger internal diameter than the main portion 112b. This increases the volume of the passageway from bellows 110 to the capillary tube, and thereby prevents the captive air-bubble within the capillary tube from reaching bellows 110. The arrangement thus substantially reduces or eliminates the possibility of air passing from the interior of capillary tube 112 outwardly through the wall of bellows 110, thereby further preserving the sensitivity of the tensiometer over a long period of use without the need for recalibration.

FIG. 3 illustrates a tensiometer including the latter feature of the tensiometer of FIG. 2, and an additional feature. Thus, in the tensiometer of FIG. 3, the capillary tube 212 includes a bottom portion 212a of larger internal diameter than the main portion 212b, as in the case and for the same purpose as in the tensiometer of FIG. 2. In addition, the top 212c of the capillary tube is also of larger internal diameter than the main portion 212b. This feature effects an expansion in the scale of the graduated markings 220 applied to portion 212b of the capillary tube. In other words, wherever it is desired to expand the scale, so that changes in the soil-tension will be indicated by a larger movement of the liquid level within capillary tube 212, this can be done by enlarging the internal diameter of the capillary tube just above the portion of the scale to be expanded.

FIG. 4 illustrates another embodiment of the invention. Here, the capillary tube is not necessary and may be eliminated or substantially shortened. Instead, the indicating device, including the expansible chamber 310, is freely movable in the tensiometer tube so as to be movable therein with the expansion and contraction of its captive air-bubble. Thus, as the chamber expands, it rises to the top of the tube (in the position illustrated in full lines in FIG. 4) and thereby indicates the soil is dry and should be watered; whereas when the chamber contracts, it sinks to the bottom of the tube (broken line position in FIG. 4) and thereby indicates the soil is sufficiently moist and no water is necessary. The tensiometer of FIG. 4 thus provides a "yes" or "no" signal with respect to the need for watering the soil. The capillary tube and its scale may thus be completely eliminated, although it may be desired to provide a short tubule 313 at the top of the expansible chamber 310, the length of which can be lengthened or shortened for presetting the point the chamber will rise to indicate the need for watering the soil. The top of the tensiometer tube 302 may be made transparent, and the expansible chamber 310, or its tubule 313, may be coloured to be viewable through the transparent top.

Further variations and applications of the illustrated embodiments will be apparent.

What is claimed is:

1. A tensiometer for measuring soil-moisture tension, comprising: a tensiometer tube hermetically sealed at the top and closed at the bottom by a water-permeable member and adapted to be completely filled with water which is permeable through said member into and out of the ground in accordance with the soil-moisture tension of the ground in which it is inserted; and an indicating device disposed within the tensiometer tube and including a member defining an expansible chamber containing a liquid and a captive gas-bubble therein; said expansible-chamber-defining member being freely movable in the tensiometer tube from a position at the top of the tube indicating the soil is dry and should be watered, to a lower position indicating the soil is sufficiently moist and no watering is necessary; the top of the tensiometer tube being transparent to permit viewing the position of the indicating device.

2. A tensiometer according to claim 1, wherein said indicating device includes a sealed tubule at its upper end, the length of which determines the point the indicating device will rise to indicate the need for watering the soil.

* * * * *